No. 857,591.  
PATENTED JUNE 25, 1907.
A. D. BRITTAIN.  
TROLLEY HARP.  
APPLICATION FILED APR. 18, 1906.
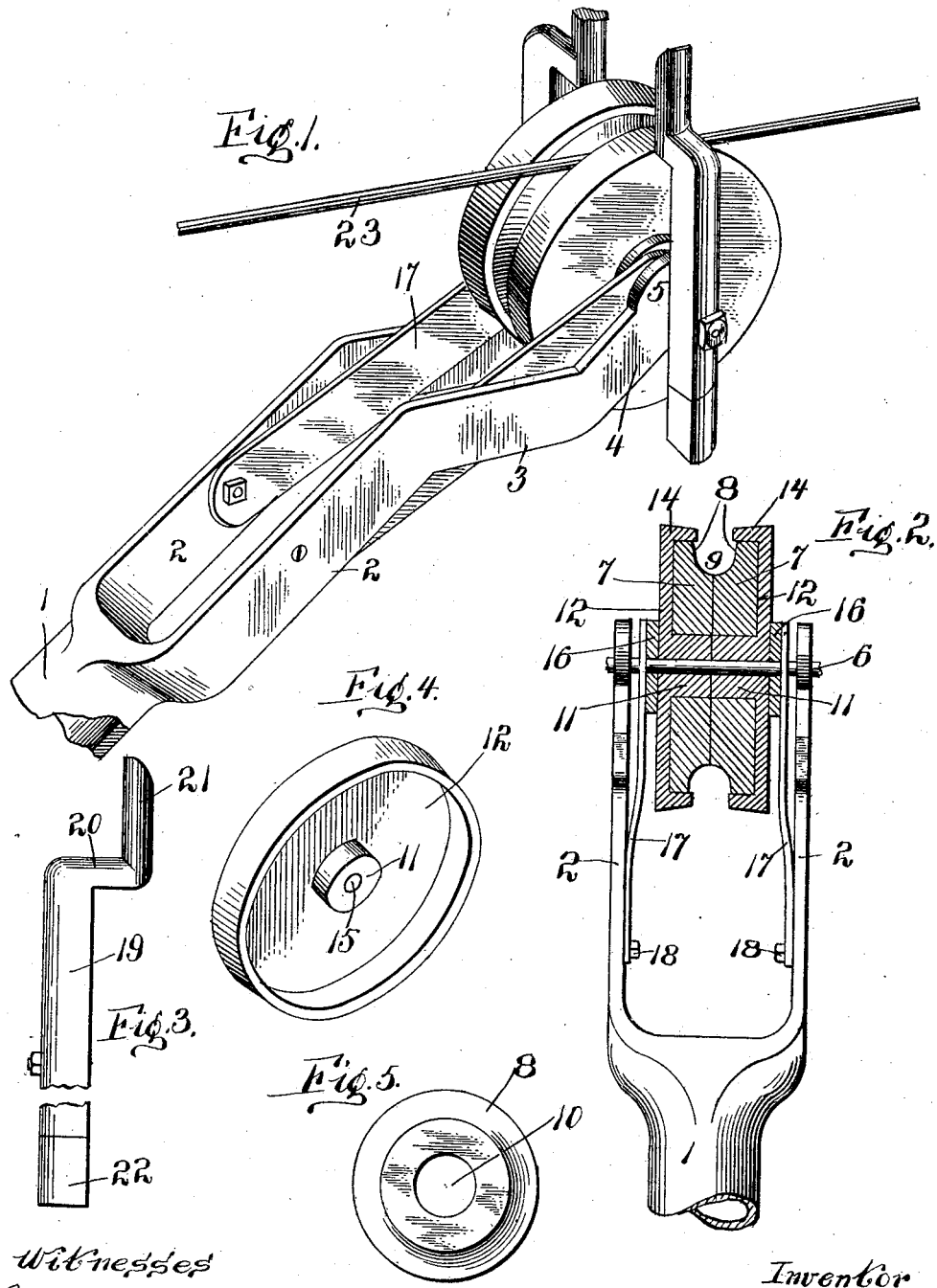

UNITED STATES PATENT OFFICE.

ARLINGTON D. BRITTAIN, OF YOUNGSTOWN, OHIO.

TROLLEY-HARP.

No. 857,591.  Specification of Letters Patent.  Patented June 25, 1907.

Application filed April 18, 1906. Serial No. 312,374.

*To all whom it may concern:*

Be it known that I, ARLINGTON D. BRITTAIN, a citizen of the United States of America, residing at Youngstown, in the county of Mahoning and State of Ohio, have invented certain new and useful Improvements in Trolley-Harps, of which the following is a specification, reference being had therein to the accompanying drawing.

This invention relates to certain new and useful improvements in trolley harps, and the invention has for its primary object the provision of a novel form of trolley harp, wherein positive and reliable means are employed for retaining the trolley wheel of said harp upon a trolley wire or similar electrical conductor.

To this end, my invention aims to dispense with the displacement of trolley wheels from trolley wires, it being a well known fact that trolley wheels are frequently displaced on account of the rapidity at which a car travels, a curve in the trolley wire, irregularities of the trolley wire, cross-over wires, and trolley pans beneath bridges. Considerable time and labor is expended in the replacing of trolley wheels and a great many accidents happen by a motorman losing control of the electrical brakes of the car owing to the displacement of the trolley wheel. To obviate the displacement of the trolley wheel, I have devised a simple and inexpensive harp having a trolley wheel journaled therein, which will automatically adjust itself to the irregularities of a trolley wire, and in connection with the harp, I use gravity arms which are adapted to extend above the trolley wheel of my improved harp and engage the trolley wire or electrical conductor should the trolley wheel of the same become displaced therefrom, the arms tending to return the wheel to its normal position upon the trolley wire.

With the above and other objects in view, which will more readily appear as the nature of the invention is better understood, the same consists in the novel construction, combination and arrangement of parts to be hereinafter more fully described and claimed, and referring to the drawing accompanying this application, like numerals of reference designate corresponding parts throughout the several views, in which:—

Figure 1 is a perspective view of my improved trolley harp, Fig. 2 is a front elevation of the same, illustrating a portion of the harp in section, and a portion thereof removed, Fig. 3 is a front elevation of one of the gravity arms of my improved harp, Fig. 4 is a perspective view of one of the wheel cups of the harp, Fig. 5 is a side elevation of one-half of a trolley wheel used in connection with the harp.

To put my invention into practice, I construct my improved harp and its appurtenant parts of strong and durable metal, the harp comprising a tubular portion 1 carrying upwardly extending side arms 2, 2, said arms being bent at an angle, as at 3, and then upwardly, as at 4, in a plane parallel with the side arms 2, 2. The upper ends of the arms 2, 2 are enlarged, as at 5, and pierced to accommodate a pin 6 upon which my improved trolley wheel and its appurtenant parts are journaled.

The trolley wheel of my improved harp consists of two circular sections 7, 7, each section conforming approximately to one-half of the trolley wheel. The sections 7, 7 have their edges curved, as at 8, 8, to form a circular groove 9, when the sections 7, 7 are in position as illustrated in Fig. 2 of the drawing. Each section is provided with a large bore 10, and adapted to fit within said bore of each section is the boss 11 of a wheel cup 12, two cups being used in connection with each trolley wheel. The cups 12, 12 are provided with inwardly extending flanges 14, 14, said flanges lying over the edges of the sections 7, 7 and practically incasing the trolley wheel. The bosses 11, 11 are provided with alining openings 15, 15, whereby the cups 12, 12 together with sections 7, 7 of the trolley wheel may be journaled upon the pins 6 of the harp.

To retain the cups 12, 12 in engagement with the sections 7, 7 of the trolley wheel, and consequently hold said sections together to form the circular groove 9, I employ washers 16, 16 upon the pin 6 at the outer sides of the cups 12, 12, and to retain said washers in engagement with the cups, resilient arms 17, 17 are secured, as at 18, 18, to the inner sides of the harp arms 2, 2. The upper ends of the arms 17, 17 are pierced to permit of the pins 6 passing therethrough, and said resilient arms are adapted to press against the washers 16, 16, and hold the trolley wheel together with its cups centrally of the harp arms 2, 2.

Upon the outer ends of the pin 6, I pivotally mount gravity arms 19, the upper ends of these arms being bent inwardly, as at 20, and upwardly, as at 21, above the trolley wheel of my improved harp, the lower ends of said arms being weighted, as at 22, whereby they will be maintained normally in a vertical position or at right angles to a trolley wire or electrical conductor 23 over which the trolley wheel of my improved harp is adapted to travel.

By the novel construction of my improved trolley harp, it will be observed that the trolley wheel thereof is resiliently held relative to the arms 2, 2 of the harp, thereby permitting of the trolley wheel shifting and accommodating itself to any deflection or irregularities in the trolley wire. Should the one side of the trolley wheel wear more rapidly than the opposite side of said wheel, as often occurs, it is possible, by the sectional trolley wheel, to renew one section thereof, thus dispensing with the necessity of discarding an entire wheel when a portion thereof has become worn.

I do not care to confine myself to the type of trolley pole in connection with which the harp is used, and such changes in the size and minor details of construction as are permissible by the appended claims, may be resorted to without departing from the spirit and scope of the invention.

What I claim and desire to secure by Letters Patent, is:—

In a trolley, the combination with a harp, and a pin or axle journaled therein, of a wheel comprising two circular wheel-sections each peripherally-grooved with the groove in one section facing the groove in the other section, and cups for said wheel-sections, each cup having an apertured boss to receive the axle or pin of the harp, the wheel sections being mounted on said bosses, and each cup having an inwardly-extending flange inclosing the ungrooved peripheral portion of the wheel-sections.

In testimony whereof I affix my signature in the presence of two witnesses.

ARLINGTON D. BRITTAIN.

Witnesses:
 L. W. DAY,
 L. P. HOFFMASTER.